United States Patent [19]

Tomasi

[11] 4,426,647

[45] Jan. 17, 1984

[54] RADAR ARRANGEMENT FOR MEASURING VELOCITY OF AN OBJECT

[75] Inventor: Jean-Pierre Tomasi, Velizy, France

[73] Assignee: U.S. Philips Corporation, New York, N.Y.

[21] Appl. No.: 241,985

[22] Filed: Mar. 9, 1981

[30] Foreign Application Priority Data

Mar. 3, 1980 [FR] France .................... 80 04708

[51] Int. Cl.³ .......................................... G01S 13/58
[52] U.S. Cl. ...................................... 343/8; 343/9 R;
  343/12 A
[58] Field of Search ............ 356/28; 343/8, 9, 12 A;
  367/89, 102

[56] References Cited

U.S. PATENT DOCUMENTS

| | | | |
|---|---|---|---|
| 2,686,302 | 8/1954 | Capelli | 343/12 A |
| 3,143,734 | 8/1964 | Raabe | 343/9 |
| 3,147,477 | 9/1964 | Dickey, Jr. | 367/89 |
| 3,525,568 | 8/1970 | Dreyfus | 356/28 |
| 3,804,518 | 4/1974 | Meyr | 356/28 |
| 3,899,251 | 8/1975 | Frenk et al. | 343/9 |
| 3,991,398 | 11/1976 | Andermo et al. | 367/89 |
| 4,041,293 | 8/1977 | Kihlberg | 343/8 |
| 4,106,017 | 8/1978 | Roeder et al. | 343/8 |

*Primary Examiner*—S. C. Buczinski
*Attorney, Agent, or Firm*—Robert J. Kraus

[57] ABSTRACT

44A radar arrangement (1) suitable for measuring the horizontal velocity v of an aircraft relative to the ground (2) comprises an high-frequency signal generator (10) including a transmitting aerial (9), a receiver including two aerials (12, 11) spaced a distance d apart along a line in the direction of the velocity to be measured and respective mixers (30, 31) and filters (32, 33), and a correlator (15) which determines the value ($\tau = d/v$) of the delay of the signals received at the rearmost aerial (11) relative to those received at the foremost (12) for which the correlation is a maximum. The signal generator (10) generates two linearly frequency-modulated waves (E2, E1) and is controlled by the correlator (15) so that the interval between E2 and E1 equals $\tau$. The height H of the aircraft can also easily be determined, being directly proportional to the beat frequency at the output of the filters (32, 33).

7 Claims, 10 Drawing Figures

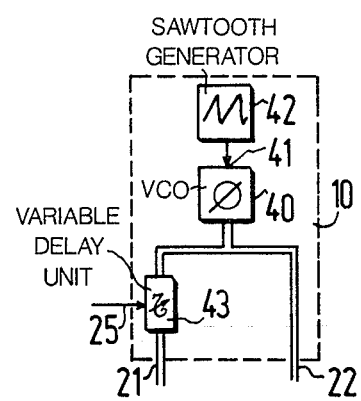
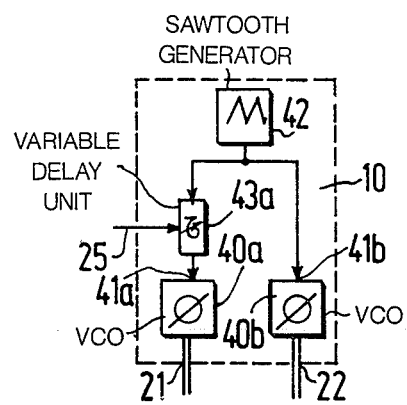
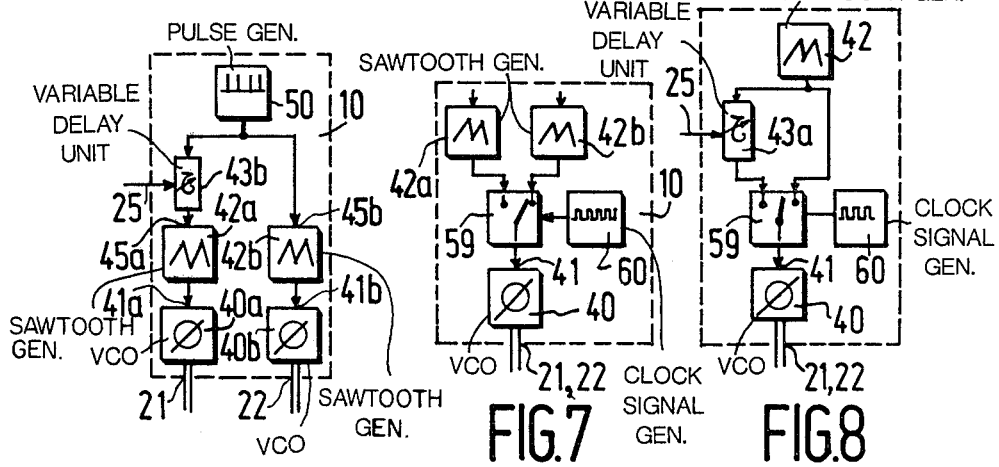
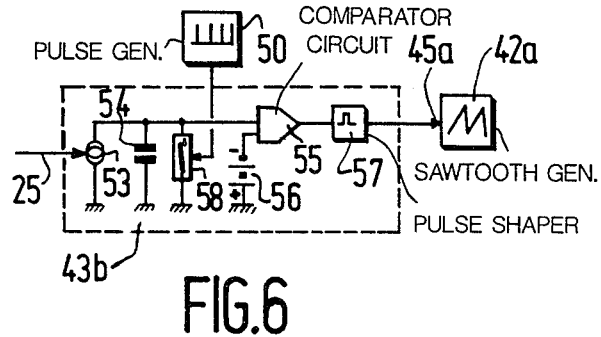

4,426,647

RADAR ARRANGEMENT FOR MEASURING VELOCITY OF AN OBJECT

BACKGROUND OF THE INVENTION

The present invention relates t a radar arrangement which is particularly intended for measuring the velocity "v" of an object. The arrangement comprises a first receiver and a second receiver which are a distance "d" apart and are in line with the direction of the velocity to be measured and have been provided to receive the waves coming from a high-frequency signal generator after being reflected by the object. The arrangement also comprises a correlator to determine the delay "$\tau$" of the output signals of the second receiver with respect to the output signals of the first receiver, the correlation being at a maximum for this delay, and an output circuit which processes the velocity information by determining the quantity $d/\tau$.

An important use of this arrangement is the measurement of the horizontal velocity of an aircraft; in that case the radar arrangement is installed on board the aircraft and the relevant object is the ground.

U.S. Pat. No. 4,041,293 discloses an arrangement of this type. In the arrangement described in this United States Patent a generator is used which transmits a signal with a fixed frequency. At certain distances between the arrangement and the ground and for particular profiles of the ground the received waves may be so weak that it is impossible to process the signals at the outputs of the receiving means. It is then not possible to measure the velocity. This known arrangement is therefore not suitable for the contemplated use for which a continuous and reliable measurement of the velocity is a requirement.

SUMMARY OF THE INVENTION

An object of the present invention is to provide an arrangement as set forth in the opening paragraph which can provide a reliable velocity measurement.

According to the invention, a radar arrangement as set forth in the opening paragraph is characterized in that the high-frequency signal generator transmits a first frequency-modulated wave and a second frequency-modulated wave and has a control terminal for shifting the two received waves in time. This control terminal is connected to an output of the correlator which produces a signal representative of the time $\tau$ by which the waves are shifted with respect to each other.

Suitably, the arrangement comprises, connected to the output of the first receiver, a first selection circuit for selecting a first reflected wave and, connected to the output of the second receiver, a second selection circuit for selecting a second reflected wave. Each selection circuit comprises a mixer circuit for mixing a respective one of the output signals of the high-frequency signal generator with the reflected wave and a filter for filtering the beat signal of a lower frequency. This embodiment has the considerable advantage that the frequency of the signal at the output of the filter directly depends on the distance between the arrangement and the object. In this manner, the distance can be measured with few additional means.

BRIEF DESCRIPTION OF THE DRAWING

Embodiments of the invention will now be described, by way of example, with reference to the accompanying diagrammatic drawings, in which:

FIGS. 3, 4, 5, 7 and 8 show different forms of a high-frequency signal generator suitable for use in an arrangement embodying the invention;

FIG. 6 shows a delay element which is part of the high-frequency signal generator shown in FIG. 5;

DESCRIPTION OF THE PREFERRED EMBODIMENTS

Figure 1:
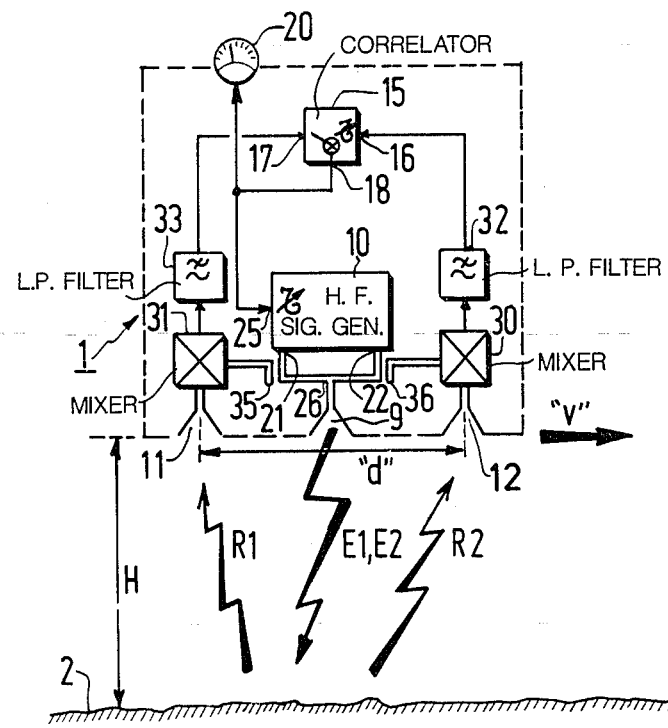
FIG. 1 shows an arrangement embodying the invention.

Referring to FIG. 1, let it be assumed that the arrangement embodying the invention, which is denoted by reference numeral 1, is installed on board an aircraft, not shown. The aircraft and, consequently, the arrangement move at a velocity "v" parallel to the ground 2. To measure this velocity a transmitting aerial 9 transmits waves which are generated by a high-frequency signal generator 10 towards the earth 2. These waves have a frequency of approximately 4.3 GHz. The ground reflects these waves, which are thereafter received by two receiving aerials 11 and 12, which are arranged along a line in the direction of the velocity "v" and which are a distance "d" apart.

To understand the principle of the invention, let it be assumed that the ground behaves as a surface which reflects the energy it has received and, consequently, as an aerial having a radiation diagram with a very large number of maxima and minima. The aerial 12, i.e. the foremost aerial, first starts scanning the radiation diagram. Thereafter, after a period of time "$\tau$" wherein $\tau = d/v$, the aerial 11, which is situated behind aerial 12 will start scanning the radiation diagram. The signals at the outputs of the aerials 11 and 12 will be substantially identical but shifted by a duration "$\tau$" which is given by the above-mentioned formula. A correlator 15 determines the value of the delay of the output signals of the aerial 12, which are applied to the input 16 thereof, for which there is the maximum degree of correlation with the output signals of the aerial 11, which are applied to the input 17 thereof. The signal representing the required delay at an output 18 of correlator 15 is applied to an indicating device 20, which supplies the information about the velocity "v", this velocity being obtained from the relation $v = d/\tau$.

The correlator 15 may be of the type disclosed in U.S. Pat. No. 3,777,133. The generator 10 is arranged for transmitting a first frequency-modulated wave E1 and a second frequency-modulated wave E2 via a first output 21 and a secon output 22, respectively, the generator having a control terminal 25 for varying the interval between the two waves. The control terminal 25 is connected to the output 18 at which a signal appears which is representative of $\tau$.

The aerial 9 can be connected to the outputs 21 and 22 of the generator 10 by means of a divider circuit 26. Before the signals from aerials 12 and 11 respectively are applied to the inputs 16 and 17 of the correlator 15, they are passed through mixer circuits, 30 and 31 respectively, and low-pass filters, 32 and 33 respectively. The output signal of the mixer circuit 31 includes a signal which is obtained from beating between the wave received by the aerial 11 and the wave available at the output 21 of the generator 10, the last-mentioned wave being derived by means of a coupling device 35. Likewise, the output of the mixer circuit 30 includes a beat frequency between the wave received by the aerial 12 and the wave available at the output 22 of the generator 10, the last-mentioned wave being derived by means of a coupling device 36.

Figure 2:
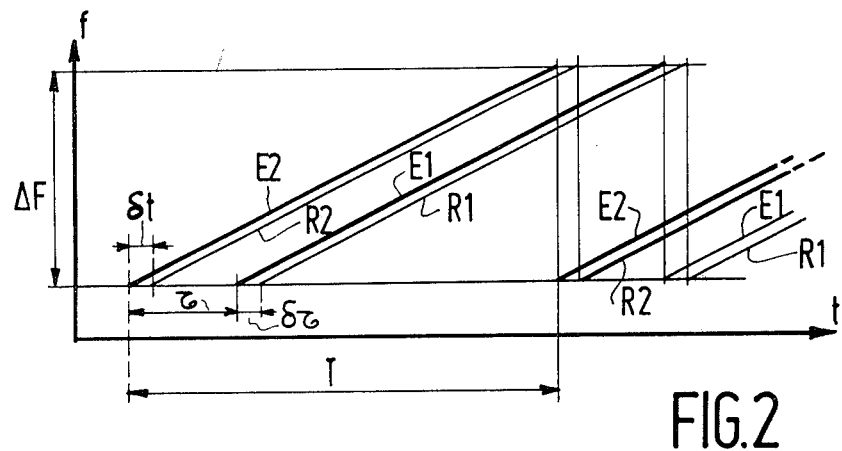
FIG. 2 shows as a function of time the frequency variations of transmitted and reflected waves.

For a better understanding of the operation of the arrangement embodying the invention, FIG. 2 will now be described. FIG. 2 shows frequency f as a function of time t. E1 is the frequency variation of the wave at the output 21 and E2 the frequency variation of the wave at the output 22. These variations are identical, extending over the same frequency range $\Delta F$, and have a duration T, but E1 is delayed relative to E2 by a period of time equal to $\tau$. In the region of the aerials 11 and 12 two reflected waves R1 and R2 correspond to the two transmitted waves E1 and E2. These waves R1 and R2 are received a period of time $\delta\tau$ after transmission of the waves E1 and E2. This period of time $\delta\tau$ is such that $$\delta\tau = 2H/c$$

wherein H is the distance of the arrangement 1 above the ground 2 and wherein c represents the velocity of light. It should be noted that in practice $\delta\tau << \tau$, so that at the output of a mixer circuit 31 the frequency of the wave obtained from beating of the wave E1 with the wave R2 is much higher than the beat frequency of the waves E1 and R1. Correspondingly, at the output of the mixer circuit 30 the beat frequency of the waves E2 and R1 is much greater than the beat frequency of the waves E2 and R2. Beating of the wave E1 with the wave R1 can be selected by means of filter 33 and the beating of the wave E2 with the wave R2 can be selected by means of filter 32.

At a predetermined instant, the frequency of the wave R2 at the aerial 12 has a given value and, at a later instant when the aerial 11 has moved to the position that the aerial 12 then occupied, the frequency of the wave R also has this given value. Thus the correlation is carried out on signals of the same frequency.

The generator 10 may be of several alternative forms. FIG. 3 shows a first form. This generator includes a voltage-controlled oscillator 40 comprising a frequency-control terminal 41 connected to the output of a generator 42 producing sawtooth signals. The output of the generator 40 is connected directly to the output 22, and is connected to the output 21 via a variable delay element 43. A control terminal of this element 43 is connected to the input 25. The circuit of FIG. 3 is only suitable for frequencies of the order of some dozens of Megahertz. For the frequency mentioned above, that is to say for frequencies of the order of 4.3 GHz, the circuit of FIG. 4, 5, 7 or 8 should be used.

The circuit shown in FIG. 4 utilizes two voltage-controlled oscillators 40a and 40b having frequency-control terminals 41a and 41b respectively. The output of the oscillator 40a forms the output 21 and the output of the oscillator 40b forms the output 22. The control terminal 41b is connected directly to the output of the sawtooth signal generator 42, and the control terminal 41a is connected to the output of the generator 42 via a variable delay element 43a. This element 43a is of a different type from the element 43 of FIG. 3 as the signals to be delayed have much lower frequencies. It is alternatively possible to use a controllable delay line for analog signals of audio frequency. In this respect reference is made to the article: Un module "retard pur" pour signaux analogiques, published in December 1979 in volume 149 of the periodical ELECTRONIQUE ET MICRO-ELECTRONIQUE INDUSTRIELLE.

The generator shown in FIG. 5 comprises two oscillators 40a and 40b the control terminals 41a and 41b of which are connected directly to the outputs of sawtooth signal generators 42a and 42b, respectively. The generators 42a and 42b can be triggered by pulses which are applied to their triggering terminals 45a and 45b, respectively. A pulse generator 50 applies its pulses directly to the terminal 45b, and via a delay element 43b to the terminal 45a. The element 43b may be of a different construction from the element 43 as it receives pulses instead of analog signals.

FIG. 6 shows a suitable arrangement for the element 43b. The element shown in FIG. 6 comprises a current generator 53 the current of which depends on the value of the signal at the input 25. This current is used to charge a capacitor 54. A comparator circuit 55 compares the voltage across the capacitor with a reference voltage produced by a source 56. A pulse-shaper device 57 applies signals derived from the comparator to the terminal 45a. The capacitor is discharged via an interrupter 58, which is arranged in parallel with the capacitor. This interrupter is closed by means of the pulses supplied by the generator 50. It will be clear that the element 43b produces pulses which are delayed with respect to the pulses of the generator 50 by an amount which is proportional to the current produced by the current generator 53.

The two oscillators 40a and 40b of the generators shown in FIGS. 4 and 5 may be replaced by a sole oscillator without the use of a high-frequency signal delay element. In FIGS. 7 and 8, which correspond to FIGS. 5 and 4 respectively, these generators include a sole oscillator denoted by the reference numeral 40. These generators comprise a two-position switch 59. This switch 59 is controlled by a clock signal generator 60, which produces clock signals at a rate which is high compared with the frequency of the sawtooth signals. Thus, the control terminal 41 of the oscillator 40 alternately receives the signals from the generators 42a and 42b as shown in FIG. 7 or alternately receives the output signal of the generator 42 and the output signal of the element 43a as shown in FIG. 8.

An arrangement embodying the invention can also measure the distance between the arrangement and the object, without requiring a great deal of circuitry, since this distance is directly related to the frequency of the signals at the output of the mixer circuits 31 and 32. It can be easily demonstrated that this frequency, denoted fb, is given by:

$$fb = \frac{\Delta F}{T} \cdot \frac{2H}{c}.$$

Figure 9:
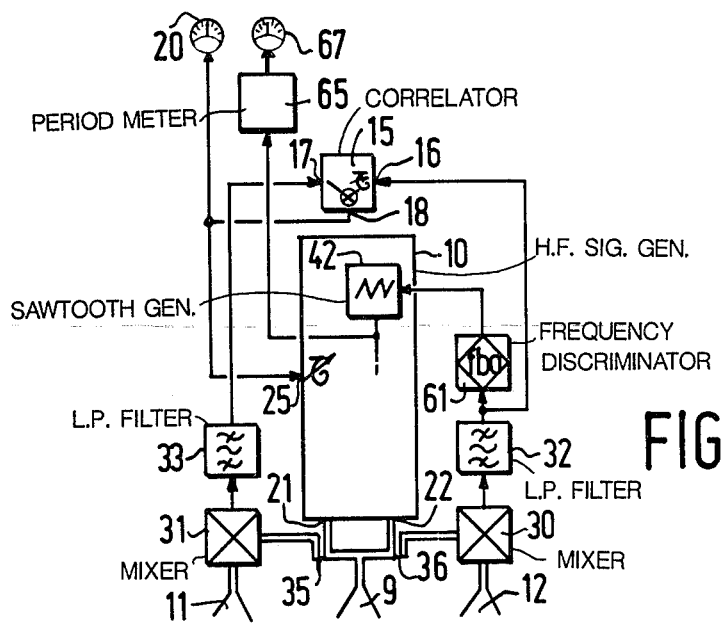
FIG. 9 shows an embodiment of the invention for also measuring the distance of the object.

An arrangement embodying the invention which also measures the distance H is shown in FIG. 9 in which elements corresponding to those of the preceding figures have been given the same reference numerals. To obtain the distance H, it is preferable (instead of measuring fb with $\Delta F$ and T fixed) to control the slope of the frequency variation so that fb has a fixed value fbo and to measure the slope of the sawtooth T/ΔF; H will be substantially proportional to this value:

$$H = fbo \times \frac{c}{2} \times \left(\frac{T}{\Delta F}\right)$$

To simplify this description, let ΔF be constant so that measuring the value of τ, which will vary as a function of H, will then give the value of H.

To measure a fixed beat frequency, the principles of Applicant's French Pat. Specification No. 1,557,670 can be used.

On the basis of these principles the arrangement shown in FIG. 9 comprises a control loop including a frequency discriminator 61, the input of which is connected to the output of the filter 32 whose passband is then centered around this same frequency; the output signal of discriminator 61 then acts on the duration of the sawtooth signal produced by the generators 42, 42a or 42b, so that the beat frequency is fixed at the value fbo.

A period meter 65 measures the period of the sawtooth and a second indicator 67, which is coupled to this period meter, supplies the user with the value of H.

Figure 10:
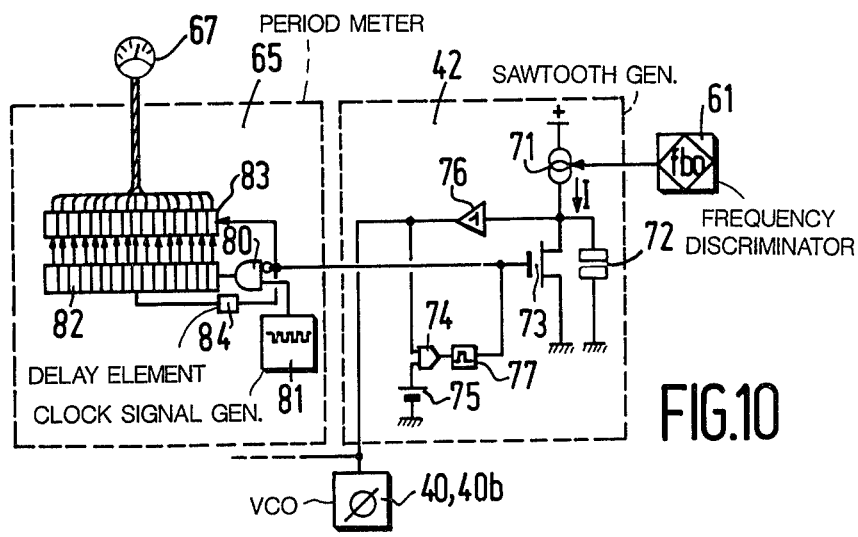
FIG. 10 shows a part of the arrangement of FIG. 9 in greater detail.

FIG. 10 shows in greater detail the circuit of a sawtooth signal generator 42 and of a period meter 65 suitable for the arrangement shown in FIG. 9.

The generator 42 comprises a current generator 71, the value of the current 1 supplied by it being controlled by the output signal of the discriminator 61. A capacitor 72 can be charged with this current. The drain-source path of a field effect transistor 73, which is first assumed to be in the non-conducting state, is connected across this capacitor. A voltage comparator 74 compares the voltage produced across the capacitor 72 with a reference voltage which is produced by a reference voltage source 75. In order not to disturb the charging operation, a buffer amplifier 76 having a gain factor "1" is connected between the capacitor 72 and the comparator 74. As soon as the voltage across the capacitor 72 reaches the value of the reference voltage, the output signal of the comparator changes, this signal change being converted into a pulse whose duration is defined by a monostable circuit 77. This pulse, which is applied to the control electrode of the transistor 73, renders this transistor conductive, and the capacitor 72 is discharged. The duration of the pulse of the monostable circuit 77 is sufficiently long to fully discharge the capacitor 72. The output of the amplifier 76 constitutes the output of the generator 42. The value of the signal at the control electrode of the transistor 73 is then an indication of whether the capacitor 72 is being charged or discharged. This signal is utilised to determine the duration of the sawtooth. This signal is applied to the period meter 65 or, more precisely, to the inverting input of an AND-gate 80, which is incorporated in this period meter 65. The other input of the gate 80 receives a periodic pulse signal from a clock 81, the duration of the pulse being much shorter than the duration of the sawtooth. The output of gate 80 is connected to the counting input of a counter 82. Thus, when the transistor 73 is in the non-conducting state, the gate 80 is open; if in this state it is assumed that the voltage at the control grid of the transistor 73 has a logic value "0", the content of the counter 82 increases at the rate of the signals of clock 81. When the signal at the control electrode of the transistor 73 assumes the value "1", the gate 80 is cut-off, and the content of counter 82 then remains unchanged. There is however a first connection which connects the inverting input of the gate 80 to the read-in control terminal of a register 83 and a second connection which connects this inverting input to the reset-to-zero terminal of the counter 82. This second connection includes a delay element 84 which effects a small delay with respect to the discharge time of the capacitor 72 so that, when the value of the logic signal at the control electrode of the transistor changes, two operations occur successively: the content of the counter 82 is transferred to the register 83 and thereafter the counter 82 is reset to zero. Decoding the content of the register 83 renders it possible for the indicator 67 to supply the user with the information about the distance.

What is claimed is:

1. A radar arrangement for measuring the velocity "v" of the arrangement relative to an object, said arrangement comprising:
   (a) a signal generator for producing first and second frequency modulated signals shifted in time with respect to each other;
   (b) transmitting means coupled to the signal generator for transmitting toward said object first and second frequency modulated waves corresponding to said first and second frequency modulated signals;
   (c) first and second receiving aerials for receiving reflections of said transmitted waves from the object, said receiving aerials being arranged in line with the direction of motion of the arrangement and being separated by a distance "d";
   (d) a first selection circuit coupled to the transmitting means and the first receiving aerial for producing a signal representative of the reflection of the first transmitted wave;
   (e) a second selection circuit coupled to the transmitting means and the second receiving aerial for producing a signal representative of the reflection of the second transmitted wave;
   (f) a correlator coupled to the first and second selection circuits and to the transmitting means, said correlator controlling the time shift of the frequency modulated waves transmitted by the transmitting means to a value τ for which correlation between signals of the same frequency produced by the selection circuits is a maximum; and
   (g) means coupled to the correlator for determining the value of "v" in accordance with the relationship v=d/τ.

2. A radar arrangement as in claim 1, wherein each selection circuit comprises:
   (a) a mixer coupled to the transmitting means and to the respective receiving aerial for beating the respective frequency-modulated signal against the signal produced by the respective aerial and for producing beat signals of different frequencies at an output thereof; and
   (b) a filter connected to the output for passing the beat signal of the lower frequency.

3. A radar arrangement as in claim 1 or 2, wherein the signal generator comprises a sawtooth generator for producing a sawtooth signal, an oscillator coupled to the sawtooth generator for producing at an output a variable frequency signal in response to the sawtooth signal, a first output coupled to the output of the oscillator through a variable delay element, and a second output coupled directly to the output of the oscillator.

4. A radar arrangement as in claim 1 or 2, wherein the signal generator comprises a sawtooth generator for producing a sawtooth signal at an output thereof, a variable delay element coupled to the output of the sawtooth generator for producing a delayed signal at an output thereof, a first variable frequency oscillator coupled to the output of the delay element for producing a variable frequency signal at an output thereof, and a second variable frequency oscillator coupled to the output of the sawtooth generator for producing a variable frequency signal at an output thereof.

5. A radar arrangement as in claim 1 or 2, wherein the signal generator comprises a pulse generator for producing pulses at an output thereof, a variable delay element coupled to the output of the pulse generator for producing delayed pulses at an output thereof, a first sawtooth generator coupled to the output of the variable delay element for triggering on the leading edge of pulses received from the variable delay element and producing a sawtooth signal at an output thereof, a second sawtooth generator coupled to the output of the pulse generator for triggering on the leading edges of pulses received from the pulse generator and producing a sawtooth signal at an output thereof, a first variable frequency oscillator coupled to the output of the first sawtooth generator for producing a variable frequency output signal in response to the first sawtooth signal, and a second variable frequency oscillator coupled to the output of the second sawtooth generator for producing a second variable frequency output signal in response to the second sawtooth signal.

6. A radar arrangement as in claim 1 or 2, wherein the signal generator comprises a sawtooth generator for producing a sawtooth signal at an output thereof, a variable delay element coupled to the output of the sawtooth generator for producing delayed signals at an output thereof, a variable frequency oscillator for producing a variable frequency signal in response to a signal applied to an input thereof, and means for alternately coupling the outputs of the variable delay element and the sawtooth generator to the input of said variable frequency oscillator.

7. A radar arrangement as in claim 1 or 2, and further including means coupled to the signal generator and to one of the selection circuits for controlling the slope of said frequency modulated signals to keep the frequencies of the signals produced by the selection circuits constant, and means coupled to the signal generator for measuring the period of said variable frequency signals and producing a signal representative of the distance between the radar arrangement and the object.

* * * * *